Patented Sept. 5, 1922.

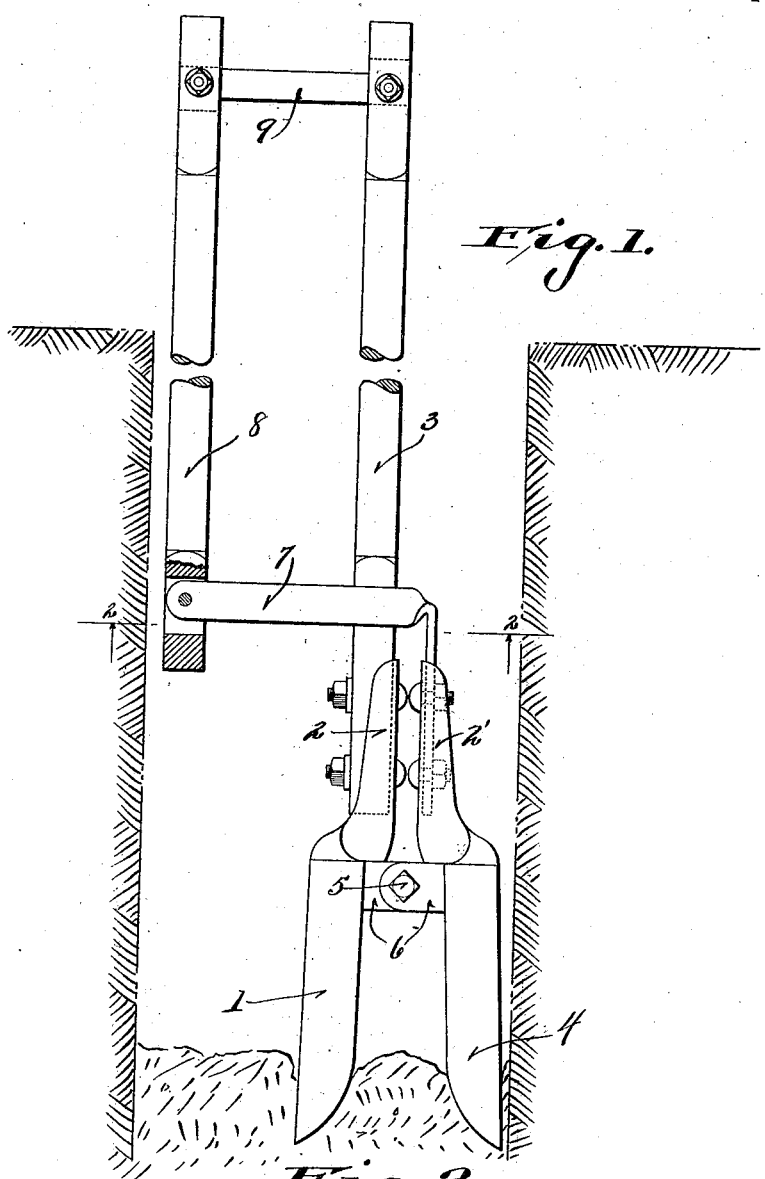
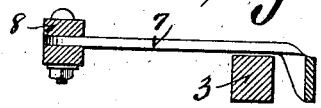

1,428,202

UNITED STATES PATENT OFFICE.

MAXIMILLION M. ARNDT, OF MANITOWOC, WISCONSIN.

POSTHOLE DIGGER.

Application filed October 11, 1920. Serial No. 416,233.

*To all whom it may concern:*

Be it known that I, MAXIMILLION M. ARNDT, a citizen of the United States, and resident of Manitowoc, in the county of Manitowoc and State of Wisconsin, have invented certain new and useful Improvements in Posthole Diggers; and I do hereby declare that the following is a full, clear, and exact description thereof.

My invention refers to that type of post hole digger essentially embodying a pair of pivoted jaws having handles extending therefrom, the same being of the scoop tongs variety. The invention has for its object to provide a simple, economical and effective digger of the above referred to type, wherein holes of any depth may be dug within the limits of the length of the handle element. In digging a post hole with the lever actuated tool mentioned above, obviously when the jaws of the tool reach a certain depth in a hole of restricted diameter, it is impossible to expand the jaws by opening the handles of the jaws upon their pivot connection by swinging the handles connected thereto, due to the fact that said handles in expanding will strike the side walls of the hole. Hence, in digging holes of any appreciable depth, the ordinary scoop shovel has to be utilized for removing the dirt, which is previously loosened by some other suitable tool. Hence, the problem solved by me is, the provision of a pair of pivotally connected jaws, one of which has the ordinary rigid handle extending therefrom of any length, and the other has a short transversely disposed arm, which is adapted to enter the post hole and which is provided with some means extending longitudinally of the rigid or master handle for actuating it, whereby irrespective of the depth of the hole, the jaws may be opened and closed under the control of the operator.

With the above object in view, the invention consists in certain peculiarities of construction, and combination of mechanical elements, as described hereinafter and called for in the claim.

In the drawing,

Figure 1 represents an elevation of a tool embodying the features of my invention, the same being shown with parts broken away and in section to more clearly illustrate structural features and positioned as indicated by dotted lines within a post hole, and Figure 2 is a detail cross-section of the same, the section being indicated by line 2—2 of Figure 1.

Referring by characters to the drawing, 1 represents a concavo-convex scoop jaw provided with a shank 2 rigidly attached to a longitudinal disposed master handle 3, the same being of any desired length or approximately in proportion to the depth of the deepest hole which is ordinarily desired.

A companion scoop or biting jaw 4 is pivotally connected to the jaw 1 by means of a bolt 5, and ears 6 which extend from the inner faces of the jaw members. All of the before mentioned structure is common to the type of post hole diggers hereinbefore mentioned.

As an exemplification of my invention, I secure to the shank 2' of the biting jaw an actuating arm 7, which arm extends transversely of the handle 3 or post hole to be dug. The arm is comparatively short and its length with respect to the pivot bolt 5, which constitutes a fulcrum therefor, is equal to the width or diameter of the smallest hole to be dug, plus the width of the biting jaw with respect to its axis.

As shown, the arm 7 terminates upon the opposite side of the jaw fulcrum with relation to said biting jaw, whereby it, in connection with the jaw mentioned, forms a bell-crank lever. The end of the arm 7 is connected to a longitudinally disposed runner or rod 8, the same being extended approximately parallel with the master handle 3 and being of a length approximately equal to the length of said handle. This runner or rod 8 constitutes an actuating means for the biting jaw and its upper end is in this instance, connected to the master handle by means of a link 9 which is in pivotal union with said handle and the end of the rod.

From the foregoing description it is obvious that when the tool is dropped into the bottom of a post hole, as shown in Figure 1 of the drawing, the master handle is utilized in connection with the weight of the tool to longitudinally exert a force, whereby the jaws will enter the earth a sufficient distance to envelop therein the desired bulk. Thereafter the operator by causing an upward pull to the runner or rod 8 will, through its arm connection with the biting jaw 4, cause said jaw to contract with relation to the digging jaw, whereby the earth between said jaws is thus firmly gripped and the tool is then extracted in the usual manner, carrying with it the load of loose earth which has previously been operated upon. Thus it will be seen that the tool can be manipulated from the upper surface to depths in proportion to the length of the handles, whereby a small hole can be dug without the assistance of other instruments, and it follows that holes dug in this manner can be finished in a comparatively short time over the old methods, wherein the scoop shovel was resorted to for removing the loose earth.

While I have shown and described one exemplification of my invention in all its details, it is understood that I may vary the structural features without departing from the spirit of the invention, as is called for in the claim.

I claim:

A hole digger comprising a master handle having a scooping jaw extending from its lower end, a biting jaw pivotally associated with the scooping jaw, a transversely disposed short arm extending from the biting jaw and spaced above said pivotal point the same constituting a bell-crank lever associated with the biting jaw, and an actuating rod connected to the end of the arm and extending approximately parallel with the master handle.

In testimony that I claim the foregoing I have hereunto set my hand at Manitowoc, in the county of Manitowoc and State of Wisconsin.

MAXIMILLION M. ARNDT.